US012779470B2

(12) United States Patent
O'Keane et al.

(10) Patent No.: US 12,779,470 B2
(45) Date of Patent: Nov. 3, 2026

(54) VESSEL SUPPORT APPARATUS AND METHODS OF USE

(71) Applicant: STEMCELL TECHNOLOGIES CANADA INC., Vancouver (CA)

(72) Inventors: Martin O'Keane, Vancouver (CA); Mark Smyth, Vancouver (CA); Kevin Chen, Vancouver (CA); Miguel Eagleton, Vancouver (CA)

(73) Assignee: STEMCELL Technologies Canada Inc., Vancouver (CA)

( * ) Notice: Subject to any disclaimer, the term of this patent is extended or adjusted under 35 U.S.C. 154(b) by 0 days.

(21) Appl. No.: 18/739,988

(22) Filed: Jun. 11, 2024

(65) Prior Publication Data

US 2024/0342727 A1 Oct. 17, 2024

Related U.S. Application Data

(63) Continuation of application No. PCT/CA2022/051845, filed on Dec. 16, 2022.

(60) Provisional application No. 63/265,563, filed on Dec. 16, 2021.

(51) Int. Cl.
*B01L 9/00* (2006.01)
*F16M 11/10* (2006.01)

(52) U.S. Cl.
CPC ................ *B01L 9/50* (2013.01); *F16M 11/10* (2013.01)

(58) Field of Classification Search
CPC . B01L 9/50; F16M 11/10; B01F 35/40; B01F 35/42; B01F 35/43; B01F 31/20; B01F 31/201; B01F 31/25
See application file for complete search history.

(56) References Cited

U.S. PATENT DOCUMENTS

| | | | | |
|---|---|---|---|---|
| 1,221,601 | A * | 4/1917 | Rowland | B25B 5/142 269/279 |
| 5,639,160 | A | 6/1997 | Kishimoto | |
| 6,514,465 | B2 * | 2/2003 | Steiner | G01N 35/028 422/65 |
| 7,054,001 | B2 * | 5/2006 | Geiger | B01L 9/523 356/244 |
| 2006/0013063 | A1 * | 1/2006 | Singh | B01F 35/531 366/239 |
| 2006/0193198 | A1 | 8/2006 | Bae | |

(Continued)

FOREIGN PATENT DOCUMENTS

| | | |
|---|---|---|
| CA | 2146500 A1 | 10/1995 |
| CN | 106574219 B | 12/2018 |

(Continued)

OTHER PUBLICATIONS

International Search Report and Written Opinion of the International Searching Authority—dated Mar. 20, 2023.

*Primary Examiner* — Marc C Howell
(74) *Attorney, Agent, or Firm* — Roni M. Jones; Oyen Wiggs Green & Mutala LLP

(57) ABSTRACT

Aspects of this disclosure relate to a vessel support apparatus and to uses of the vessel support, such as in the laboratory setting. Apparatus of this disclosure may secure a vessel thereto, such as when the apparatus is in operation or use. Vessel support apparatus will comprise a vessel supporting means and one or more means for securing the vessel to the supporting means.

19 Claims, 7 Drawing Sheets

(56) References Cited

U.S. PATENT DOCUMENTS

| | | | | |
|---|---|---|---|---|
| 2007/0020152 | A1* | 1/2007 | Costello, III | G01N 35/028<br>422/400 |
| 2013/0011224 | A1* | 1/2013 | Hoyer | B01L 9/523<br>414/222.01 |
| 2013/0316446 | A1* | 11/2013 | Andersson | B01F 31/23<br>435/305.1 |

FOREIGN PATENT DOCUMENTS

| | | | |
|---|---|---|---|
| DE | 102012011354 | B4 | 3/2017 |
| EP | 1186891 | B1 | 7/2006 |

* cited by examiner

VESSEL SUPPORT APPARATUS AND METHODS OF USE

CROSS-REFERENCE TO RELATED APPLICATION

This application is a continuation of Patent Cooperation Treaty (PCT) application No PCT/CA2022/051845, having an international filing date of 16 Dec. 2022 and entitled VESSEL SUPPORT APPARATUS AND METHODS OF USE, which in turn claims priority from, and for the purposes of the United States the benefit of 35 USC § 119 in respect of, U.S. application No. 63/265,563 filed 16 Dec. 2021 and entitled VESSEL SUPPORT APPARATUS AND METHODS OF USE. All of the applications in this paragraph are hereby incorporated herein by reference.

TECHNICAL FIELD

This disclosure relates to apparatus, and more specifically to apparatus for supporting and securing a vessel resting thereupon. In a specific aspect, this disclosure relates to vessel support apparatus that may be used in scientific applications and/or methods, such as in cell culture and/or analytical applications.

BACKGROUND

Technicians frequently employ various apparatus that facilitate processes in industrial, analytical, or laboratory workflows. Broad examples of such apparatus include plate readers, orbital shakers or other types of shakers, heat blocks, etc. With reference to orbital and other types of shakers, a vessel is supported thereupon and a user activates the shaker to cause the vessel, and the contents therein, to be mixed.

Problems encountered by users of known shakers or rockers include a limited range of motion and/or an inability to secure a vessel to the apparatus. Further, many apparatus require prior to or during operation at least some or a considerable amount of hands-on intervention on the part of users.

Accordingly, there is a need for apparatus capable of movement and/or oscillation in one or more planes and/or axes while securing a vessel thereto during operation. An automated apparatus that accomplishes the foregoing functions may be particularly desirable.

SUMMARY

In one aspect of this disclosure are provided vessel support apparatus. An exemplary vessel support may comprise: i) a base; ii) a stage connected to the base for supporting a vessel placed thereupon; iii) at least one opposed set of retention members connected to the stage, the at least one opposed set of retention members commutable relative to one another; iv) a limit integrated into each retention member for securing the vessel on the stage; and v) a limit integrated into each retention member of an opposed set thereof for securing the vessel on the stage.

In one embodiment, the stage defines a stage plane. In one embodiment, the stage has a center point.

In one embodiment, the stage is tilted or tiltable about a tilt axis.

In one embodiment, a vessel support of this disclosure may further comprise a tilt actuator for tilting the stage about the tilt axis. In one embodiment, the tilt axis is parallel to an edge of the stage.

In one embodiment, the stage is movable along the stage plane along the x axis, along the y axis, or both along the x and y axes (the x- and y-axes lying in the stage plane).

In one embodiment, one or more of the at least one opposed set of retention members are respectively extendable and retractable. In one embodiment, each of the at least one opposed set of retention members are respectively extendable and retractable.

In one embodiment, one or more of the at least one opposed set of retention members linearly extend and retract along the stage plane.

In one embodiment, one or more of the at least one opposed set of retention members are fixed, such as to the stage. In one embodiment, each of the at least one opposed set of retention members are fixed, such as to stage.

In one embodiment, each retention member is a bracket. In one embodiment, at least one bracket of the opposed set of retention members is deformable and resilient.

In one embodiment, the limit is a wall or a corner of the bracket.

In one embodiment, each retention member of the at least one opposed set of retention members is chamfered or beveled.

In one embodiment, a vessel support of this disclosure may further comprise a leading edge connected along an incline to a lagging edge on each retention member of the at least one opposed set of retention members, the lagging edge set inward from the leading edge relative to a center point of the stage (in the stage plane).

In one embodiment, the vessel ramps up the incline to raise the vessel in an axis normal to the stage plane as the at least one opposed set of retention members extend, and the vessel ramps down the incline to lower the vessel in the axis normal to the stage plane as the at least one opposed set of retention remembers retract.

In one embodiment, a vessel support of this disclosure may further comprise an actuator for extending and retracting the at least one opposed set of retention members.

In one embodiment, a vessel support of this disclosure may further comprise a pivoting member connected to the actuator. In one embodiment, the pivoting member is pivotally connected to the stage.

In one embodiment, the at least one opposed set of retention members are connected to the pivoting member.

In one embodiment, a vessel support of this disclosure may further comprise a plurality of arms respectively connecting each of the retention members to the pivoting member. In one embodiment, the plurality of arms are pivotally connected to the pivoting member.

In one embodiment, a first pair of the plurality of arms are attached to the pivoting member 180 degrees from one another.

In one embodiment, a second pair of the plurality of arms are attached to the pivoting member 180 degrees from one another.

In one embodiment, attachment of each of the first pair of the plurality of arms to the pivoting member is not 90 degrees from each of the second pair of the plurality of arms.

In one embodiment, a vessel support of this disclosure may further comprise one or more compliant member in each of a first opposed set of the plurality of arms, or in each of a second opposed set of the plurality of arms, or in both.

In one embodiment, the one or more compliant member is intermediate a connection of the plurality of arms to the retention members and a connection of the plurality of arms to the pivoting member.

In one embodiment, the limit is a pin. In one embodiment, the pin engages the vessel when the opposed set of retention members are extended. In one embodiment, the pin engages a wall, edge or a corner of the vessel, such as on an underside thereof.

In one embodiment, the pin or the bracket is resilient.

In one embodiment, the pin on each of an opposed set of retention members in an extended configuration cooperate to secure the vessel to the stage.

In one embodiment, each bracket attached to the stage, or each bracket on each of an opposed set of retention members in a retracted configuration, cooperate to secure the vessel to the stage.

In one embodiment, a vessel support of this disclosure may further comprise one or more load sensors.

In one embodiment, a vessel support of this disclosure may further comprise one or more load sensors.

In one embodiment, a vessel support of this disclosure may further comprise one or more load sensors, wherein the culture vessel disengages the one or more load sensors when the plurality of retention members are in the extended configuration.

In one embodiment, a vessel support of this disclosure may further comprise one or more motor driven lead screws. In one embodiment, the one or more motor driven lead screws move the stage in a plane of the stage. In one embodiment, the stage is movable in the x axis (lying in the stage plane), in the y axis (lying in the stage plane), or both the x and y axes (lying in the stage plane). In one embodiment, a first motor driven lead screw moves the stage in the x axis, and a second motor driven lead screw moves the stage in the y axis.

In another exemplary embodiment, a vessel support of this disclosure may comprise i) a base; ii) a stage connected to the base; and iii) at least one opposed set of retention members connected to the stage, the at least one opposed set of retention members biasable against one or more edges of a vessel supported on the stage to thereby secure the vessel to the stage.

In one embodiment, the stage is tilted relative to the base. In one embodiment, the stage is tiltably connected to the base. In one embodiment, a vessel support may further comprise a tilt actuator for tilting the stage about a hinge (e.g. a tilt axis).

In one embodiment, the vessel support comprises a vessel supporting surface that defines a stage plane having an x-axis and a y-axis. In one embodiment, the stage (e.g. the vessel supporting surface) is movable in the stage plane, such as in the x-axis, in the y-axis, or in both the x- and the y-axes.

In one embodiment, a vessel support of this disclosure may further comprise one or more motor driven lead screws. In one embodiment, the one or more motor driven lead screws move the stage relative to the base. In one embodiment, the stage is movable along the x axis (relative to the stage plane), along the y axis (lying in the stage plane), or both along the x and y axes (lying in the stage plane). In one embodiment, a first motor driven lead screw moves the stage along the x axis, and a second motor driven lead screw moves the stage along the y axis.

In one embodiment, a vessel support of this disclosure may further comprise a limit on each of the at least one opposed set of retention members that respectively engage one or more edges, walls or corners of a vessel secured to the stage.

In one embodiment, the limit is a pin. In one embodiment, the pin is resilient. A resilient pin may bend when a force is applied against it and then return to its original position in the absence of the force.

In one embodiment, the at least one opposed set of retention members are fixed relative to the stage. In one embodiment, a portion of the at least one opposed set of retention members are fixedly attached to the stage. In such embodiments, the at least one opposed set of retention members, or a portion thereof, may be deformable and restorative deformation forces bias the limit on each of the at least one opposed set of retention members against one or more outer edges or walls of a vessel positioned on the stage.

In one embodiment, one or more of the at least one opposed set of retention members are respectively extendable and retractable, such as extendable from a first position to a second position and retractable from the second position to the first position.

In one embodiment, one or more of the at least one opposed set of retention members are respectively extendable and retractable (such as extendable from a first position to a second position and retractable from the second position to the first position), and extending the at least one opposed set of retention members biases the limits thereon against one or more edges or walls of the vessel. In one embodiment, the one or more edges or walls are on an (inner) underside of the vessel (e.g. a skirted vessel).

In one embodiment, a vessel support of this disclosure may further comprise one or more actuators (directly or indirectly) connected to one or more of the at least one opposed set of retention members. In one embodiment, the one or more actuators extend and retract one or more of the at least one opposed set of retention members.

In one embodiment, a vessel support of this disclosure may further comprise a pivoting member. In one embodiment, the at least one opposed set of retention members and the one or more actuators are connected to the pivoting member and actuation of the pivoting member moves the at least one opposed set of retention members between a first extended position and a second retracted position.

In one embodiment, the pivoting member is pivotally connected to the stage. In one embodiment, the pivoting member is a wheel that rotates bi-directionally about an axis through a center point of the wheel.

In one embodiment, a vessel support of this disclosure may further comprise a plurality of arms respectively connecting each of the retention members to the pivoting member. In one embodiment, the plurality of arms are pivotally connected to the pivoting member.

In one embodiment, a first pair of the plurality of arms are attached to the pivoting member 180 degrees from one another, or stated differently attachment of each arm of the first pair of arms are angularly separated from one another by 180 degrees about a center point of the pivoting member.

In one embodiment, a second pair of the plurality of arms are attached to the pivoting member 180 degrees from one another, or stated differently attachment of each arm of the second pair of arms are angularly separated from one another by 180 degrees about a center point of the pivoting member.

In one embodiment, attachment of each arm of the first pair of the plurality of arms to the pivoting member is not 90 degrees from each arm of the second pair of the plurality of arms, or stated differently attachment of each arm of the first pair of arms are angularly separated by more or less than 90 degrees (but less than 180 degrees) about a center point of the pivoting member relative to attachment of each arm of the second pair of arms to the pivoting member.

In one embodiment, a vessel support of this disclosure may further comprise one or more compliant member in each of a first opposed set of the plurality of arms, or in each of a second opposed set of the plurality of arms, or in both. In one embodiment, the one or more compliant member is intermediate the connections (of a respective arm of the plurality of arms) to a respective retention member and the pivoting member.

In one embodiment, each retention member of the at least one opposed set of retention members comprises a chamfered or beveled portion. In one embodiment, each chamfered or beveled retention member (of an opposed set of retention members) may further comprise a leading edge connected along an incline to a lagging edge, the lagging edge set inward from the leading edge relative to a center point of the stage. In one embodiment, a vessel ramps up the incline to raise the vessel in an axis normal to the vessel supporting surface as the at least one opposed set of retention members extend, and the vessel ramps down the incline to lower the vessel in the axis normal to the vessel supporting surface as the at least one opposed set of retention remembers retract.

In one embodiment, a vessel support of this disclosure may further comprise one or more load sensors. In one embodiment, a vessel support of this disclosure may further comprise one or more load sensors, wherein the vessel disengages the one or more load sensors when the at least one opposed set of retention members are extended.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

DETAILED DESCRIPTION

Figure 1:
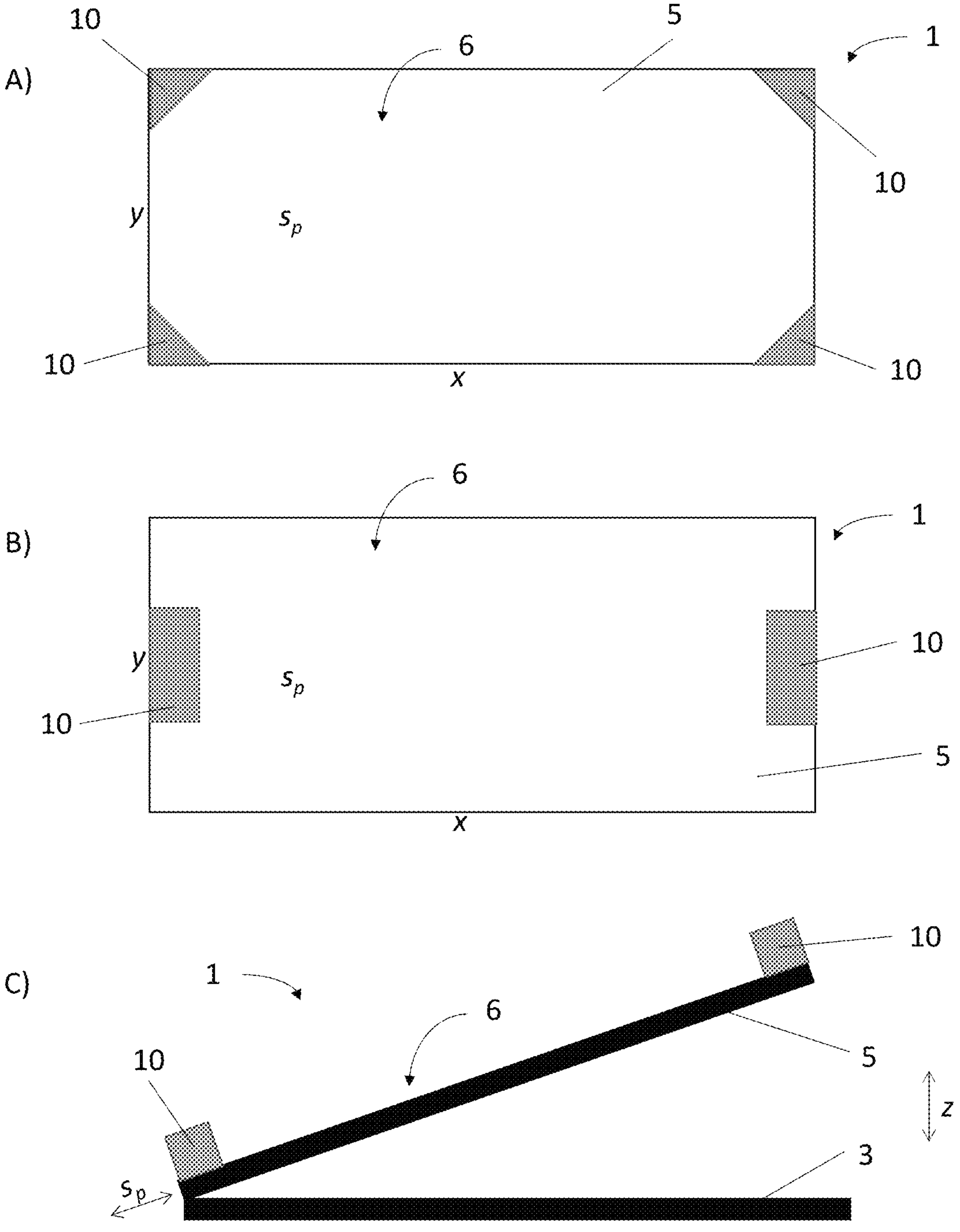
FIG. 1 shows generalized embodiments of vessel support apparatus of this disclosure. Panels A) and B) show top views of two different generalized embodiments, and panel C) shows a front view of the embodiments depicted in panels A) and B). Any of the elements as described herein may be incorporated into either of the depicted embodiments.

Various apparatus, systems, and methods are described below to provide an example of at least one embodiment of the claimed subject matter. No embodiment described below limits any claimed subject matter and any claimed subject matter may cover apparatus, systems and methods that differ from those described below. The claimed subject matter are not limited to systems, apparatus and methods having all of the features of any one system, apparatus or method described below or to features common to multiple or all of the systems, apparatus and methods described below. Subject matter that may be claimed may reside in any combination or sub-combination of the elements or process steps disclosed in any part of this document including its claims and figures. Accordingly, it will be appreciated by a person skilled in the art that a system, apparatus or method disclosed in accordance with the teachings herein may embody any one or more of the features contained herein and that the features may be used in any particular combination or sub-combination that is physically feasible and realizable for its intended purpose.

Furthermore, it is possible that systems, apparatus or methods described below is not an embodiment of any claimed subject matter. Any subject matter that is disclosed in a system, apparatus or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term “about” which means a variation up to a certain amount of the number to which reference is being made, such as 1%, 2%, 5%, or 10%, for example, if the end result is not significantly changed.

It should also be noted that, as used herein, the wording “and/or” is intended to represent an inclusive—or. That is, “X and/or Y” is intended to mean X or Y or both, for example. As a further example, “X, Y, and/or Z” is intended to mean X or Y or Z or any combination thereof.

This disclosure relates to apparatus, and more specifically to apparatus for supporting and securing a vessel resting thereupon while in operation. In a specific aspect, this disclosure relates to vessel support apparatus that may be used in scientific applications, such as in cell culture or analytical applications. In one embodiment, the vessel is cell culture plate or flask. In one embodiment, the vessel is a skirted cell culture plate or flask.

Where used in this disclosure, the term “commutable” refers to the property of an element or part thereof being capable of at least some movement or displacement. For example, a retention member of this disclosure may be deformable or stretchable, yet return to its original shape when no longer being deformed or stretched (i.e. may be prone to restorative deformation forces). In such embodiments, a retention member may in another example be capable of a change in physical location, and then returnable to its starting location.

Apparatus

In one aspect of this disclosure are provided apparatus for supporting a vessel. A vessel may be any container, such as a tissue culture flask, a microplate, or a microwell device.

Apparatus of this disclosure may also secure a vessel thereto, such as when the apparatus is in operation or use. In one embodiment, apparatus comprises a vessel supporting means (e.g. a stage), and one or more means for securing the vessel to the supporting means (e.g. retention members). In one embodiment, apparatus of this disclosure comprise a plurality of means for securing the vessel to the supporting means. In one embodiment, apparatus of this disclosure comprise sets of means for securing the vessel to the supporting means. It may be important that means for securing the vessel to the supporting means are provided in opposed sets, or in sets that cooperate to secure the vessel to supporting means.

Figure 2:
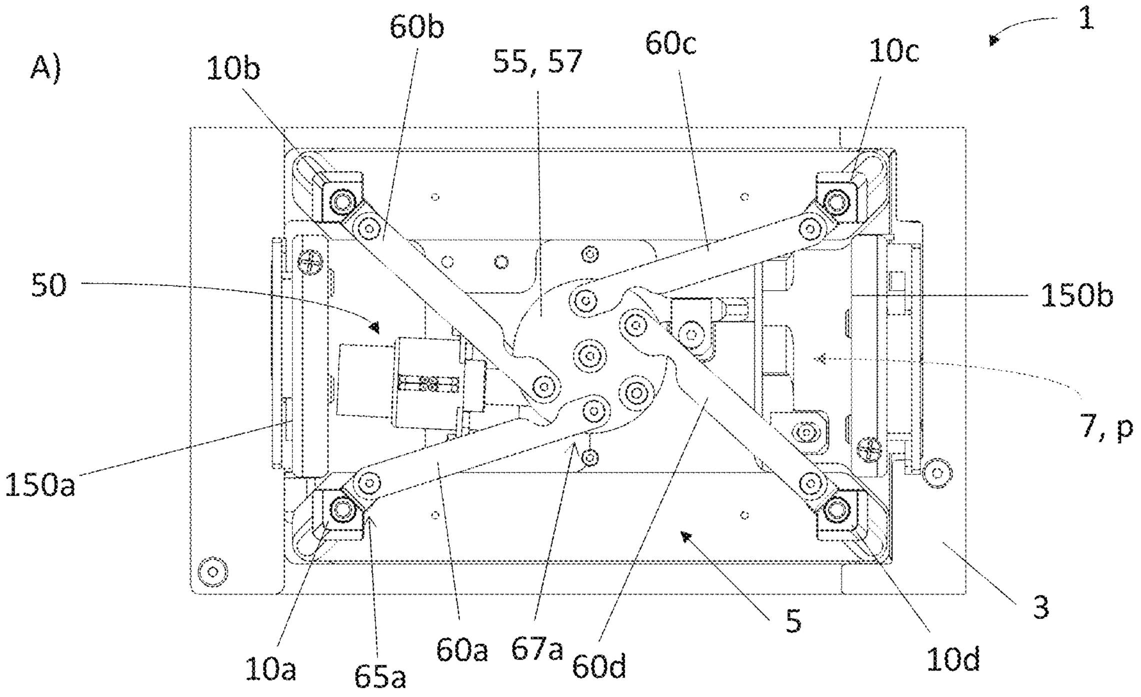
FIG. 2 shows a top plan view of a vessel support of this disclosure. An embodiment of the vessel support is depicted with the at least one opposed set of retention members in either the retracted (A) or the extended (B) configuration.
Figure 2:
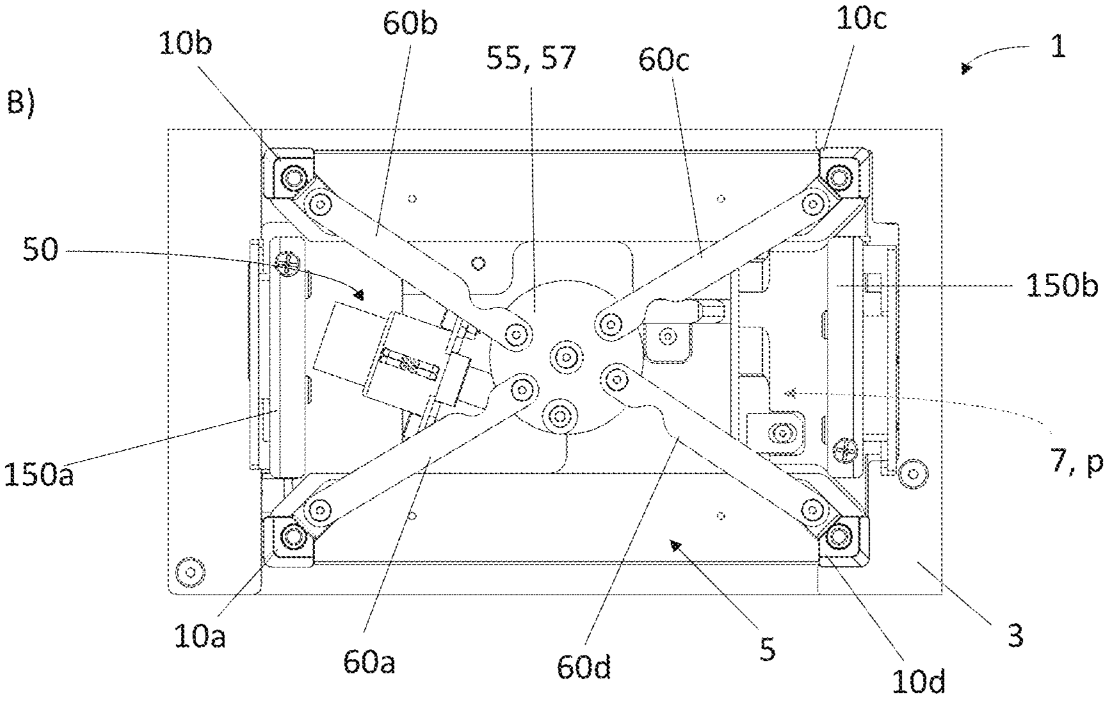
Figure 6:
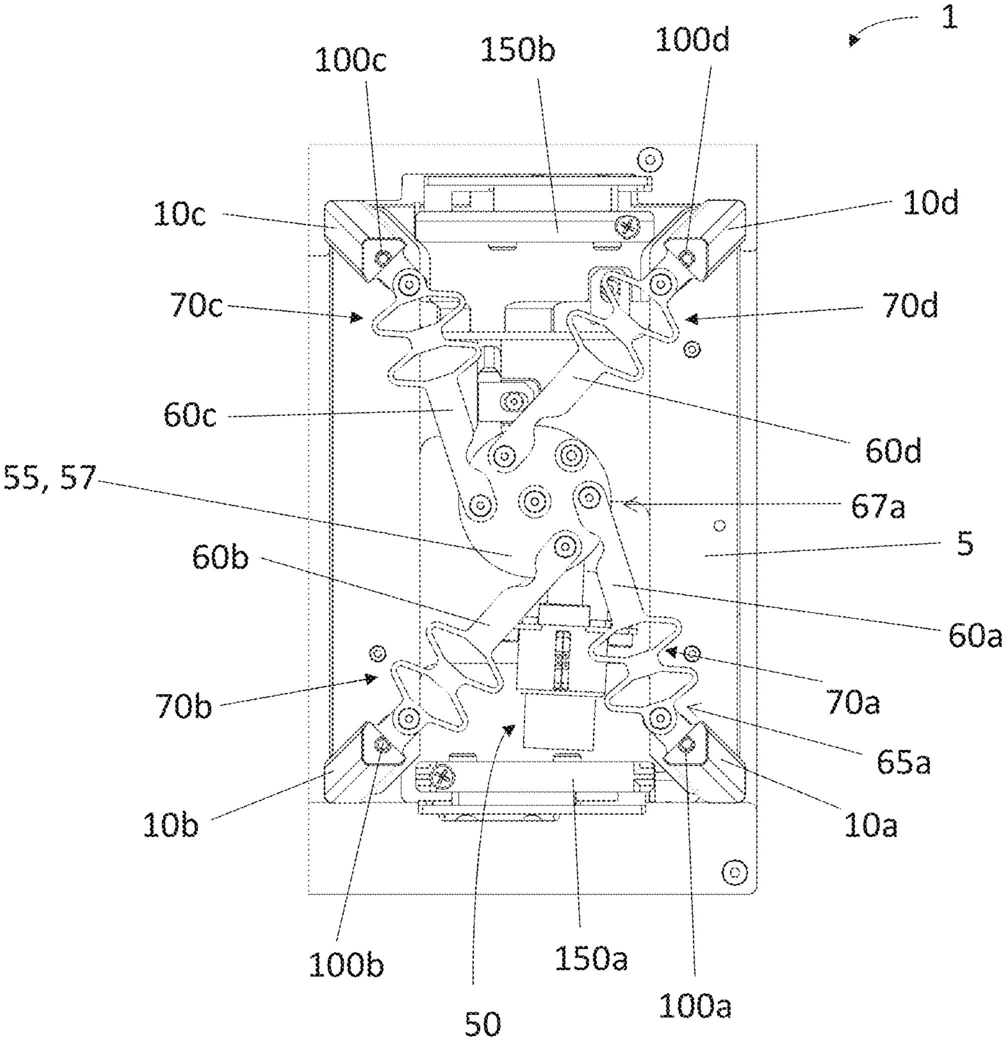
FIG. 6 shows a top plan view of a vessel support of this disclosure comprising an alternative embodiment of the plurality of arms from those depicted in FIG. 2.

FIGS. 1, 2 and 6 show different embodiments of apparatus of this disclosure. In one embodiment, a vessel support 1 may comprise a base 3 and a stage 5 connected to the base. The stage 5 may support a vessel placed thereupon, and thus stage 5 comprises a vessel supporting surface 6 or surfaces.

Stage 5, or more specifically the vessel supporting surface(s) 6, may define a stage plane $s_p$. In one embodiment, stage 5 (e.g. the vessel supporting surface(s) 6) is stationary or fixed with respect to base 3. In one embodiment, stage 5 (e.g. the vessel supporting surface(s) 6) is movable with respect to base 3. For example, stage 5 may be capable of movement in one or more of the x-axis, the y-axis, and the z-axis relative to base 3 (or the stage plane) (see FIG. 1). In one embodiment, stage 5 is capable of movement in two or more of the x-axis, the y-axis, and the z-axis relative to base 3 (or the stage plane). In one embodiment, stage 5 is capable of movement in each of the x-axis, the y-axis, and the z-axis relative to base 3 (or the stage plane).

When referring to x- and y-axes herein, such axes generally lie in the stage plane $s_p$ (FIG. 1). When referring to the z-axis herein, such axis is generally normal to the xy axis (as defined by the stage plane $s_p$.

In one embodiment, stage 5 is tiled relative to base 3. In one embodiment, stage 5 is pivotally or tiltably connected to base 3 at a pivot p (see FIGS. 2 and 3), such as by a hinge. In such an embodiment, stage 5 may be tilted about pivot p in the z-axis relative to base 3. In one embodiment, stage 5 is manually tiltable about pivot p. In one embodiment, stage 5 is tilted responsive to an electrical signal.

In embodiments where stage 5 is tilted responsive to an electrical signal, pivot p may comprise a tilt actuator 7 for tilting stage 5 upward and downward about a tilt axis t (see FIG. 3C, for example). In one embodiment, tilt axis t is parallel to an edge of stage 5. In one embodiment, tilt axis t is substantially in the same plane as an edge of stage 5.

In one embodiment, vessel support 1 comprises a plurality of retention members 10 (see FIGS. 1-6). In one embodiment, plurality of retention members 10 are connected to stage 5. In one embodiment, vessel support 1 comprises sets of retention members 10. In one embodiment, vessel support 1 comprises at least one opposed set of retention members 10. Herein, retention members may be denoted in the collective sense by reference numeral 10, and depending on the number of retention members they may be individually referred to as 10*a*, 10*b*, and so on.

In one embodiment, plurality of retention members 10, such as at least one opposed set of retention members, are commutable (e.g. displaceable) relative to one another. Relative displacement of retention members 10 may facilitate the placement and/or the securement of a vessel on the stage, between plurality of retention members 10 (e.g. at least one opposed set thereof).

In one embodiment, plurality of retention members 10, such as at least one opposed set of retention members, are biasable. In one embodiment, plurality of retention members 10, such as at least one opposed set of retention members, are biasable against one or more edges, walls or corners of a vessel supported on the stage to thereby secure the vessel to the stage.

As described further below, retention members 10 may be fixed in position (to stage 5), and one or more may be made of or comprise flexible or deformable material which can be stretched, so as to accommodate and receive a vessel between at least one opposed set of retention members 10. In a different embodiment, retention members 10 are connected to stage 5 but are not in a fixed position, and move in space (e.g. in a linear axis in the stage plane) relative to one another.

In embodiments where retention members 10 are fixed, they may be fixed to stage 5. In one embodiment, retention members 10 (e.g. at least one opposed set of retention members) are brackets. Retention members 10, such as brackets, may be connected to stage 5 using any conventional means, such as by means of an adhesive, interference fit into a correspondingly shaped groove in stage 5, or using hardware such as rivets, screws, or bolts.

In embodiments where retention members 10 are fixed relative to stage 5, at least one bracket of the at least one opposed set of retention members is deformable. In one embodiment, more than one bracket of the at least one opposed set of retention members is deformable. Nevertheless, deformable bracket(s) are resilient, and may therefore return to their original shape after being manipulated or stretched. Thus, deformable bracket(s) may be manipulated or stretched to accommodate a vessel therebetween, but have sufficient restorative deformation forces to return to or tend toward their original shape to secure a vessel to stage 5.

In the foregoing embodiments, retention members 10 (e.g. one or both of at least one opposed set of retention members) may be made of a polymer, such as a thermoplastic polymer. In a specific such embodiment, the thermoplastic polymer is ABS polymer, or the like.

In embodiments where retention members 10 may change position or physically move, one or more of the at least one opposed set of retention members 10 may extend and retract (relative to a center point of the stage). In one embodiment, one or more of the at least one opposed set of retention members 10 extend and retract along a linear axis in a plane parallel to stage 5, such as along stage plane $s_p$.

Figure 3:
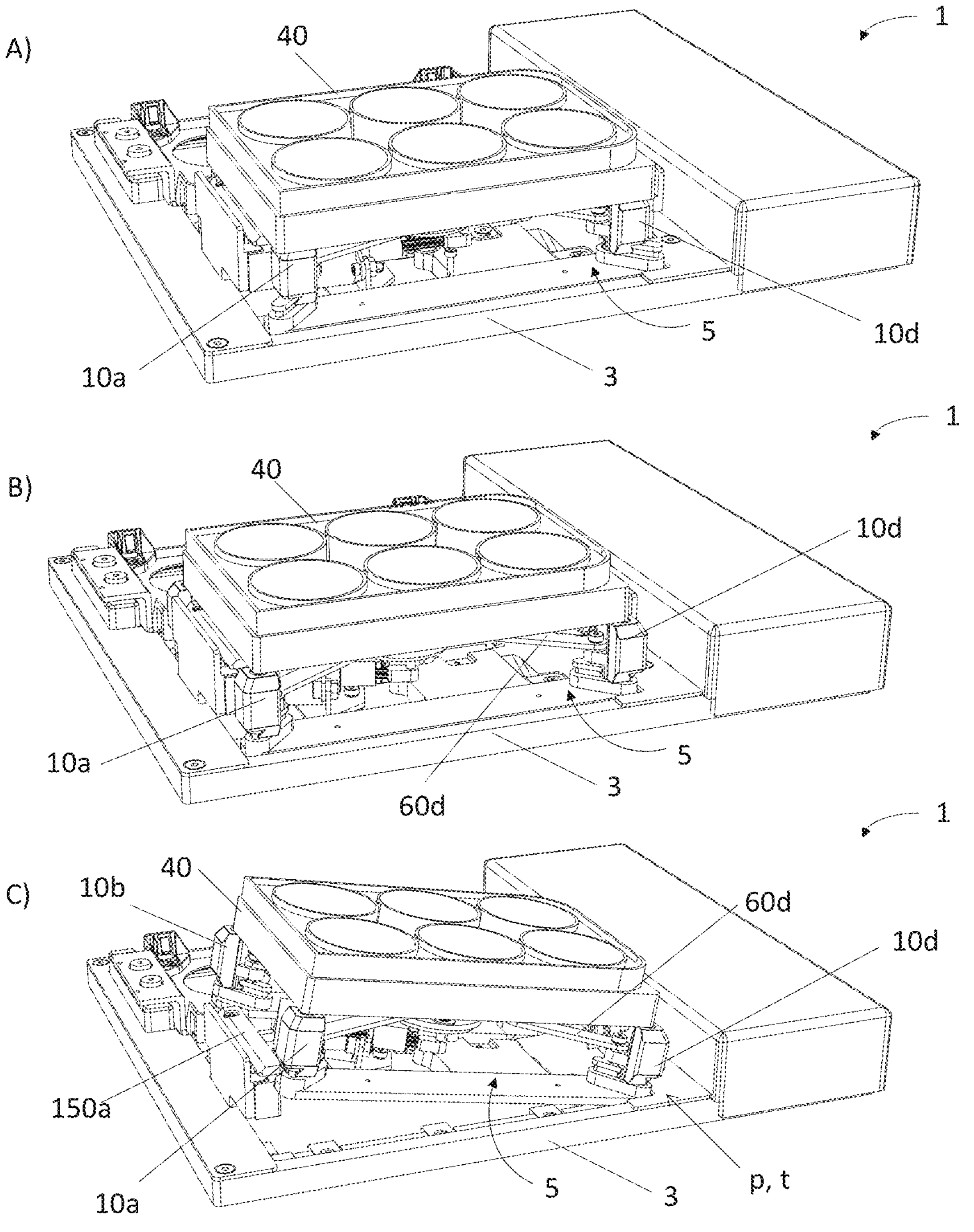
FIG. 3 shows a perspective view of a vessel support of this disclosure in operation. An embodiment of the vessel support is depicted in the resting position with the at least one opposed set of retention members retracted and disengaged from a vessel resting thereupon (A). The vessel support is depicted in the resting position with the at least one opposed set of retention members in the extended configuration, and the limits of an opposed set of the retention members engaging an edge or corner of the vessel resting thereupon (B). The vessel support of (B) in the inclined or tilted configuration (C).
Figure 4:
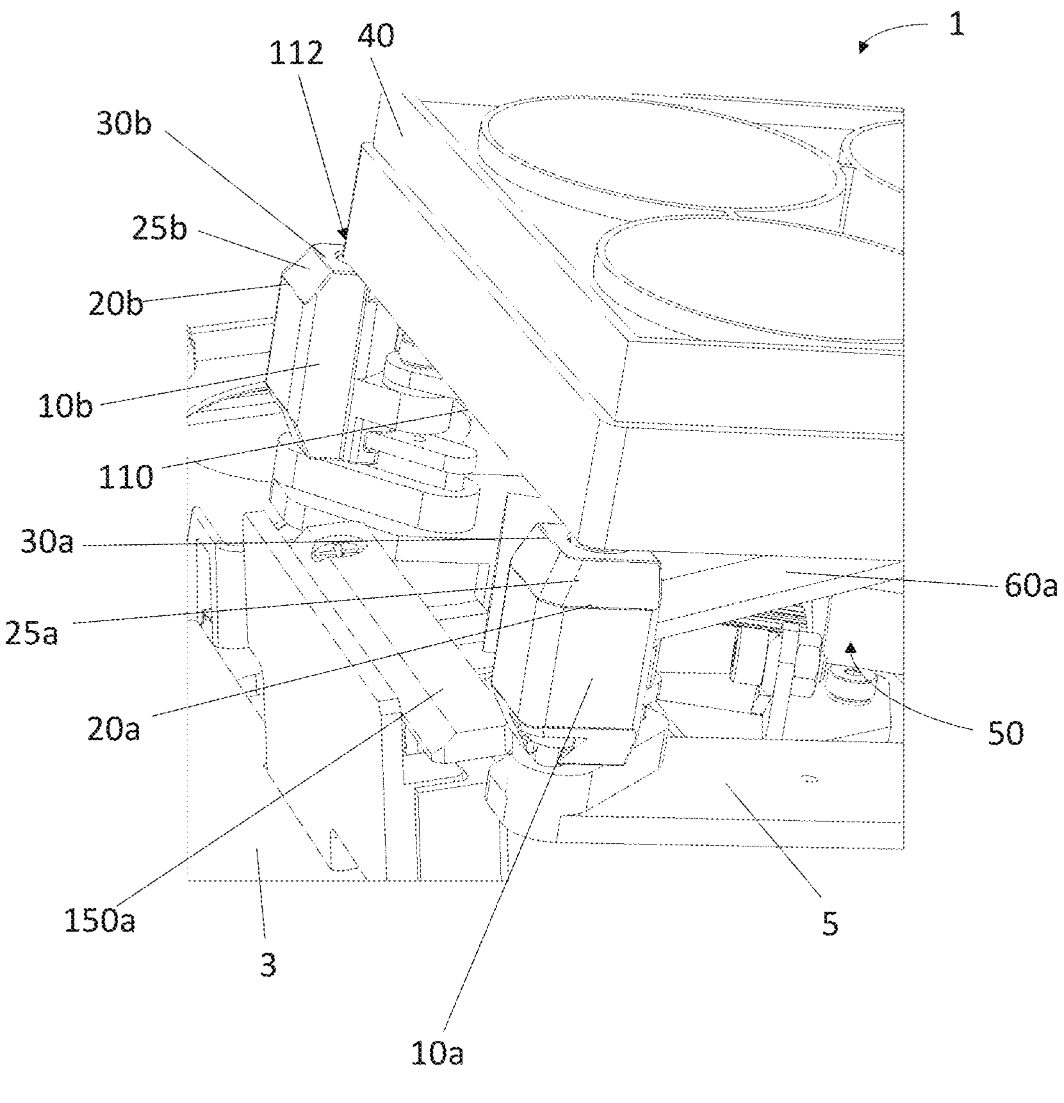
FIG. 4 shows an enlarged view of a portion of the vessel support depicted in FIG. 3C.
Figure 5:
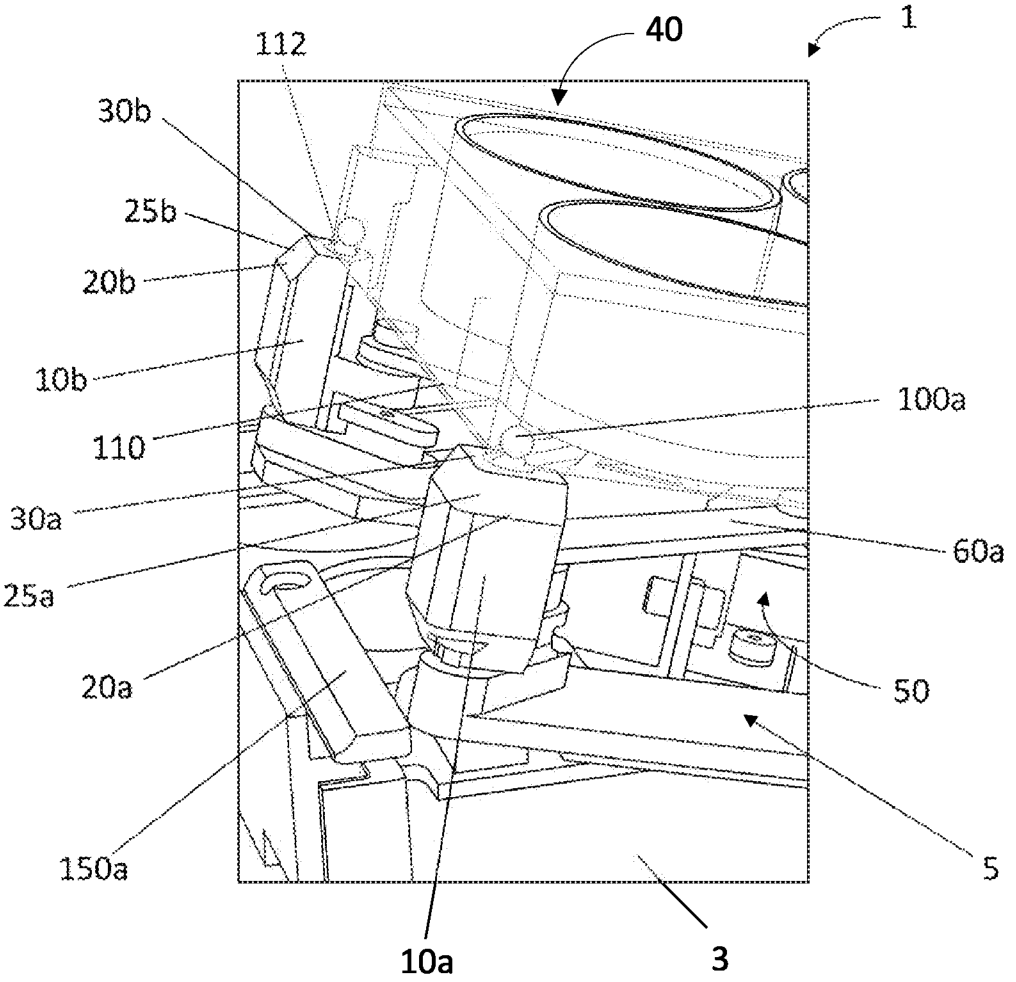
FIG. 5 shows the same image as in FIG. 4, except that the vessel is shown transparently.

In one embodiment, retention members 10 (e.g. at least one opposed set of retention members) are chamfered or beveled, or comprise a chamfered or beveled portion (see FIGS. 3-5). In one embodiment, vessel support 1 comprises a first opposed set of chamfered or beveled retention members 10*a* and 10*c*. In one embodiment, vessel support 1 comprises first (10*a* and 10*c*) and second (10*b* and 10*d*) opposed sets of chamfered or beveled retention members. In one embodiment, vessel support 1 comprises at least one opposed set of the plurality of retention members 10.

The following description refers to FIGS. 4 and 5, and only one or two of the plurality of chamfered or beveled retention members 10 (i.e. 10*a* and 10*b*) are shown. The description of one or both chamfered or beveled retention members 10*a* and 10*b*, may equally apply to additional chamfered or beveled retention members, such as chamfered or beveled retention members 10*c* and 10*d* (which are not shown in FIGS. 4 and 5).

By way of example, chamfered or beveled retention member 10*a* may comprise a leading edge 20 (and specifically 20*a* in the context of retention member 10*a*) connected along an incline 25 (and specifically 25*a* in the context of retention member 10*a*) to a lagging edge 30 (and specifically 30*a* in the context of retention member 10*a*). In one embodiment, each of the opposed set of the plurality of retention members comprise leading edge 20 connected along incline 25 to lagging edge 30. In one embodiment, lagging edge 30 is set inward from leading edge 20 relative to a center point of stage 5 (in the stage plane).

Thus, a vessel 40 resting on stage 5, and more specifically the vessel support surface(s) 6 (e.g. on each of an opposed set of beveled or chamfered retention members 10), may ramp up incline 25 to raise the vessel in the axis normal to stage 5 (e.g. the stage plane) as at least one opposed set of retention members 10 extend, and vessel 40 may ramp down incline 25 to lower the vessel in the axis normal to stage 5 (e.g. the stage plane), as the at least one opposed set of retention remembers 10 retract (FIGS. 3A and 3B).

Referring to FIGS. 2, and 4-6, in one embodiment vessel support 1 further comprises an actuator 50 for extending and retracting at least one opposed set of retention members 10. In one embodiment, one or more actuators are comprised in vessel support 1. For example, a single actuator may be responsible for extending and retracting one or more of the retention members 10. Or, multiple actuators may be responsible for extending both retention members of an opposed set. Or, multiple actuators may be responsible for extending and retracting each retention member, regardless of the number of opposed sets. In any event, actuation of the one or more actuators extends or retracts one or more retention member, such as one or more retention members of an at least one opposed set.

In one embodiment, actuator 50 is connected to base 3. In one embodiment, actuator 50 is connected to stage 5. Since actuator 50 may cause the relative movement of at least one opposed set of retention members 10 to grip a vessel positioned on vessel support 1 (thereby securing the vessel to stage 5), it may be referred to as a grip actuator.

Actuators of different types and of different activation means are known to those of skill in the art. For example, actuator 50 may be a linear actuator or a rotary actuator. Further, actuator 50 may be stepper motor driven or solenoid driven.

In one embodiment, vessel support 1 comprises at least one actuator response element 55 in communication with actuator 50. In one embodiment, at least one actuator response element 55 is connected to actuator 50. In one embodiment, at least one actuator response element is a pivoting member, such as a pivoting wheel. Thus, in one embodiment pivoting member 57 is connected to actuator 50 and actuation or a stroke of actuator 50 causes pivot member 57 to rotate.

In one embodiment, pivoting member 57 is (pivotally) connected to base 3. In one embodiment, pivoting member is (pivotally) connected to stage 5, particularly in these embodiments where stage 5 is tilted or tiltable.

The degree of rotation/pivot of pivoting member 57 may be constrained. For example, rotation/pivot of pivoting member 57 may be limited by a travel or stroke of actuator 50. In one embodiment, a travel of actuator 50 results in about +/−4 degrees of rotation/pivot of pivot member. In one embodiment, a travel of actuator 50 results in about +/−6 degrees of rotation/pivot of pivot member. In one embodiment, a travel of actuator 50 results in about +/−8 degrees of rotation/pivot of pivot member. In one embodiment, a travel of actuator 50 results in about +/−10 degrees of rotation/pivot of pivot member. In one embodiment, a travel of actuator 50 results in about +/−12 degrees of rotation/pivot of pivot member. In one embodiment, a travel of actuator 50 results in about +/−14 degrees of rotation/pivot of pivot member. In one embodiment, a travel of actuator 50 results in about +/−16 degrees of rotation/pivot of pivot member. In one embodiment, a travel of actuator 50 results in about +/−18 degrees of rotation/pivot of pivot member. In one embodiment, a travel of actuator 50 results in about +/−20 degrees of rotation/pivot of pivot member. While the rotation/pivot of pivoting member 57 may be greater than +/−20 degrees, in most embodiments it will not be greater than 90 degrees.

In one embodiment, at least one opposed set of retention members 10 and the one or more actuators 50 are connected to pivoting member 57, and actuation or a stroke of actuator 50 pivots or rotates pivoting member 57 thereby moving or driving at least one opposed set of retention members 10 between a first extended position and second retracted position (see FIGS. 3A and 3B).

Figure 7:
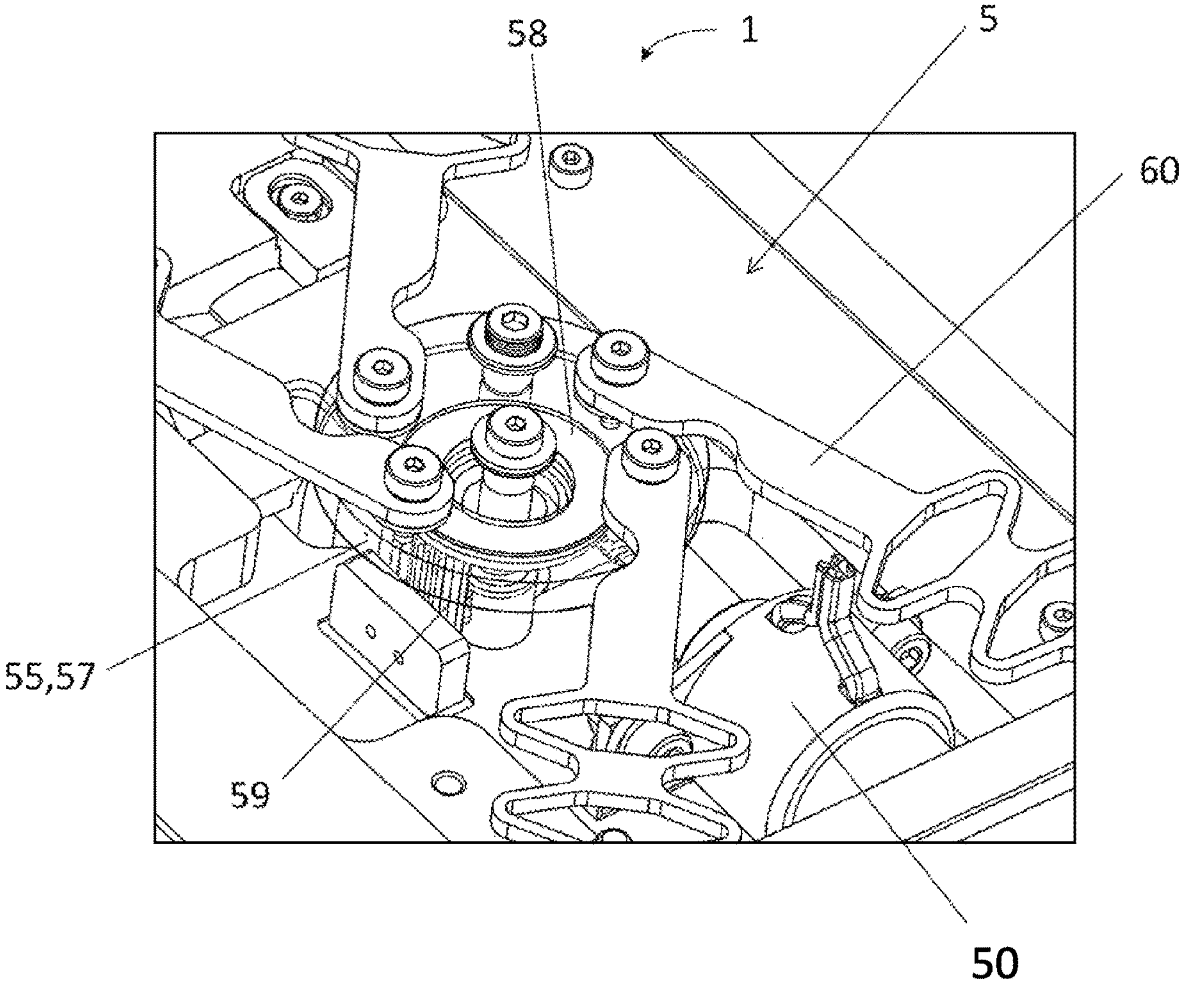
FIG. 7 shows a partial perspective view of an alternative embodiment of a vessel support, wherein an actuator response element (e.g. pivot wheel) is shown in phantom lines to reveal the positioning of an exemplary magnetic feedback feature.

Vessel support 1, and more particularly actuator response element 55, such as pivoting member/wheel 57, may further comprise one or more magnetic features 58. In one embodiment, one or more magnetic features 58 are positioned in a plane of rotation or pivot of pivoting member/wheel 57 (FIG. 7). In one embodiment, one or more magnetic features 58 are arranged in a ring that is adhered or otherwise attached to an underside of actuator response element 55, such as pivoting member 57. In one embodiment, one or more magnetic features 58 are arranged in a ring that is integrated into or comprised in actuator response element 55, such as pivoting member 57. In one embodiment, more than one magnetic features 58 are comprised in or attached to actuator response element 55 (e.g. pivoting member 57).

In one embodiment, more than one magnet poles are interspersed about magnetic feature 58. In one embodiment, at least 4 magnet poles are arranged in or about magnetic feature. In one embodiment, at least 6 magnet poles are arranged in or about magnetic feature. In one embodiment, at least 8 magnet poles are arranged in or about magnetic feature. In one embodiment, at least 10 magnet poles are arranged in or about magnetic feature. In one embodiment, at least 12 magnet poles are arranged in or about magnetic feature. In one embodiment, at least 14 magnet poles are arranged in or about magnetic feature. In one embodiment, at least 16 magnet poles are arranged in or about magnetic feature. In one embodiment, at least 18 magnet poles are arranged in or about magnetic feature. In one embodiment, at least 20 magnet poles are arranged in or about magnetic feature. In one embodiment, at least 22 magnet poles are arranged in or about magnetic feature. In one embodiment, at least 24 magnet poles are arranged in or about magnetic feature. In one embodiment, at least 26 magnet poles are arranged in or about magnetic feature. In one embodiment, at least 28 magnet poles are arranged in or about magnetic feature. In any event, the number of magnet poles will be determined by the level of sensitivity desired and/or a radius of pivoting member/wheel 57.

In one embodiment, vessel support 1 further comprises a read head 59 connected to base 3 or to stage 5 (see FIG. 7). Thus, one or more magnetic features 58 and read head may cooperate (via feedback from read head 59) to feedback whether or not rotation/pivoting has occurred and the magnitude of such pivoting (in either direction). In one embodiment, read head 59 detects the magnetic fields of the one or more magnetic features 58 (e.g. magnet poles) as they travel past read head 59. In one embodiment, read head 59 may feedback whether or not rotation/pivoting has occurred and the magnitude of such pivoting (in either direction) based on the number of magnetic fields having passed by.

In one embodiment, actuation or a stroke of actuator 50 (as connected to actuator response element 55, such as pivoting member 57) causes pivoting member 57 to pivot in different directions. For example, a downstroke of actuator 50 may pivot/rotate pivoting member 57 in a first direction thereby driving or extending one or more retention members 10 from a first retracted position to a second extended position, and an upstroke of actuator 50 may pivot/rotate pivoting member 57 in a second (e.g. opposite) direction thereby retracting one or more retention members 10 from the second extended position to the first retracted position.

In one embodiment, vessel support 1 further comprises a plurality of arms 60 respectively attached to each retention member 10 and to actuator response element 55, such as pivoting member 57. Thus, arms 60 may connect retention members 10 to actuator response element 55, such as pivoting member 57. Depending on the number of arms 60, individual arms 60 may herein be referred to as 60*a*, 60*b*, and so on. In one embodiment, a first end 65 of an arm 60 is attached to a retention member 10, and a second end 67 of an arm 60 is attached to actuator response element 55, such as pivoting member 57 (see FIGS. 2 and 6 where first end and second end are shown for only one arm, but can apply to any of the other arms depicted).

In one embodiment, plurality of arms 60 may be fixedly connected to or integral with respective ones of the retention members 10. In one embodiment, plurality of arms 60 may be pivotally connected to respective ones of the retention members 10.

In one embodiment, vessel support 1 comprises a first opposed set of arms 60, for example arms 60*a* and 60*c*. In one embodiment, vessel support 1 comprises an opposed first (60*a* and 60*c*) and an opposed second (60*b* and 60*d*) set of arms. Vessel support 1 preferably comprises at least one opposed set of the plurality of arms 60. Thus, at least one opposed set of retention members 10 extend and retract as a pushing and pulling force is applied thereto by an opposed set of plurality of arms 60 in response to actuation or a stroke of actuator 50.

Plurality of arms 60 are connected to the at least one actuator response element 55, such as pivoting or rotating member 57. In one embodiment, plurality of arms 60 are pivotally connected to the at least one actuator response element 55, 57.

In one embodiment, a first opposed set of the plurality of arms 60 are attached to the at least one actuator response element 55, 57 180 degrees from one another, or stated differently attachment of each arm of the first pair of arms are angularly separated from one another by 180 degrees about a center point of the pivoting member.

In embodiments including a second opposed set of the plurality of arms 60, second opposed set of the plurality of arms 60 are attached to the at least one actuator response element 55, 57 180 degrees from one another, or stated differently attachment of each arm of the second pair of arms are angularly separated from one another by 180 degrees about a center point of the pivoting member.

In one embodiment, attachment of each arm of the first pair of the plurality of arms to the pivoting member is not 90 degrees from each arm of the second pair of the plurality of arms, or stated differently attachment of each arm of the first pair of arms are angularly separated by more or less than 90 degrees (but less than 180 degrees) about a center point of the pivoting member relative to attachment of each arm of the second pair of arms to the pivoting member.

In one embodiment, a first opposed set of arms 60 comprises a first arm and a second arm. In such an embodiment, the first arm is attached to pivoting member 57 at a first location, and the second arm is attached to pivoting member 57 at a second location, wherein the first location is angularly separated from the second location by approximately 180 degrees about a center point of pivoting member 57.

In embodiments comprising two opposed sets of arms 60, the first arms may be attached to pivoting member 57 as described above, and the second opposed set of arms 60 comprises a third arm and a fourth arm. In such an embodiment, the third arm is attached to pivoting member 57 at a third location, and the fourth arm is attached to pivoting member 57 at a fourth location, wherein the third location is angularly separated from the fourth location by approximately 180 degrees about a center point of pivoting member 57. In such embodiment, the first location may be angularly separated from the third location by more than or less than 90 degrees about the center point of pivoting member 57, and the second location may be angularly separated from the fourth location by more than or less than 90 degrees about the center point of pivoting member 57.

Where at least one actuator response element 55 is a pivoting or rotatable member 57, attachment of one of the first opposed set of the plurality of arms thereto may need to be appropriately spaced apart from the attachment of one of the second opposed set of the plurality of arms. In order, for retention members 10 connected to each of the first and/or second opposed sets of the plurality of arms 60 to extend and retract substantially the same distance, each arm of the second opposed set of the plurality of arms is attached to the at least one grip actuator response element less than 90 degrees from a nearest arm of the first opposed set of the plurality of arms. In other words, attachment of each of the first pair of the plurality of arms to the pivoting member is not 90 degrees from each arm of the second pair of the plurality of arms. The foregoing may be particularly applicable when retention members 10 are arranged in each corner of a rectangle, and less applicable when retention members are arranged in each corner of a square.

Thus, responsiveness (e.g. pivoting/rotating) of actuator response element 55, 57 to a stroke of actuator 50 will cause either extension or retraction of plurality of arms 60, and of retention members 10 connected thereto. Accordingly, a vessel positioned on stage 5 and over retention members 10 will raise or lower in an axis normal to stage 5 as an edge or edges of the vessel ramp up or down inclines 25 of retention members 10.

Referring to FIG. 6, in one embodiment vessel support 1 may further comprise at least one compliant member 70 in one or both arms of an opposed set of the plurality of arms 60. Depending on the number of arms 60, individual of the at least one compliant member 70 may herein be referred to as 70*a*, 70*b*, and so on.

In one embodiment, vessel support 1 comprises a plurality of compliant members 70 in each arm of an opposed set of the plurality of arms 60. In an embodiment of vessel support 1 that includes a first opposed set and a second opposed set of the plurality of arms, at least one compliant member 70 may be comprised in each arm of the first opposed set of the plurality of arms, or in each arm of the second opposed set of the plurality of arms, or in both. In one embodiment, only one arm of an opposed set of the plurality of arms comprises one or more compliant member.

In one embodiment, at least one compliant member 70 is integral with each arm of the plurality of arms 15. In one embodiment, at least one compliant member 70 may comprise a resilient (e.g. stretchable and compressible) material, such as a polymer, a metal spring, a rubber, or the like. In one embodiment, each arm comprising a compliant member may be made of the same material. As will be discussed further below, at least one compliant member 70 may reduce a force exerted against the walls or edges or corners of a vessel on vessel support 1, such as by an opposed set of the plurality of retention members 10.

In one embodiment, one or more compliant members 70 in an arm are intermediate first end 65 and second (opposed) end 67 of the arm. In one embodiment, the first end of the arm is connected to a retention member 10 and the second end of the arm is connected to the at least one actuator response element 55 (e.g. pivoting member 57).

Vessel support 1 may further comprise a limit 100 integrated into or on each of the at least one opposed set of retention members 10 (see FIGS. 5 and 6). In one embodiment, limit 100 is integrated into or on each retention member 10. Limits 100 respectively engage one or more edges, walls, or corners 110, 112 of a vessel 40 to secure the vessel to the stage. In one embodiment, the edges, walls or corners of the vessel are on the outer sides of the vessel. In one embodiment, the edges, walls or corners of the vessel are on the inner (e.g. under) sides of the vessel, such as a skirted vessel.

In one embodiment, limit 100 is a pin, lug, or the like. In one embodiment, limit 100 is rigid or stiff. In one embodiment, limit 100 is resilient or bendable. In one embodiment, limit 100 bends by about 1 degree, 2 degrees, 3 degrees, 4 degrees, 5 degrees, or more. In one embodiment, a resilient or bendable limit 100 may return to its original position, such as under a restorative deformation force.

Limit 100 will interface with a vessel supported on vessel support 1, specifically on stage 5 and/or vessel support surface 6 thereof. In one embodiment, limit 100 (e.g. a pin) is disposed on each retention member 10 of an opposed set of retention members 10. In one embodiment, limit 100 is a wall or a corner of a retention member, such as a bracket.

In one embodiment, the at least one opposed set of retention members 10, or a first and a second retention member, are biasable outwardly (relative to a center point of stage 5) against one or more inside edges, walls, or corners of a vessel 40, to secure the vessel to stage 5. In such an embodiment, at least a portion of one or more of the retention members is deformable inwardly and restorative deformation forces bias the retention member(s) against one or more inside edges, walls, or corners of a vessel 40, to secure the vessel to stage 5. In such an embodiment, at least a portion of each of the at least one opposed set of retention members 10, or a first and a second retention member, is fixed relative to stage 5.

In one embodiment, at least a portion of each of the at least one opposed set of retention members 10, or a first and a second retention member, is moveable outwardly (relative to a center point of the stage) from first positions to second positions to outwardly bias the retention members against one or more inside edges, walls, or corners of the vessel.

In one embodiment, the at least one opposed set of retention members 10, or a first and a second retention member, are biasable inwardly (relative to a center point of stage 5) against one or more outside edges, walls, or corners of vessel 40, to secure the vessel to stage 5. In such an embodiment, at least a portion of one or more of the retention members is deformable outwardly and restorative deformation forces bias the retention member(s) against one or more outer edges, walls, or corners of a vessel 40, to secure the vessel to stage 5.

In one embodiment, at least a portion of each of the at least one opposed set of retention members 10, or a first and a second retention member, is moveable inwardly (relative to a center point of the stage) from first positions to second positions to outwardly bias the retention members against one or more outer edges, walls, or corners of the vessel.

In one embodiment, at least one opposed set of retention members 10 are deformable and restorative deformation forces bias limit 100 on each of the at least one opposed set of retention members against one or more outer edges, walls, or corners of vessel 40. In one embodiment, at least one opposed set of retention members 10 are extendable and retractable, and extending the at least one opposed set of retention members biases limits 100 against one or more inner edges, walls, or corners on the (inner) underside of vessel 100, such as a skirted vessel.

Referring to FIG. 5, in one embodiment limit 100 (e.g. pin) engages an edge (or wall) 110 or corner 112 of vessel 40 when a retention member 10 is in the extended position (under the influence of actuator 50). In one embodiment, limits 100 (e.g. pins) of an opposed set of retention members 10 engage opposed edges (or walls) 110 or corners 112 of vessel 40. Thus, in such embodiments, limits 100 (e.g. pins) of an opposed set of retention members 10 cooperate to secure a vessel to stage 5.

In embodiments where limit 100 of each of an opposed set of retention members are pins, lugs or the like, they cooperate to secure a vessel to stage 5 when in an extended configuration. In embodiments where limit 100 of each of an opposed set of retention members are inner walls or corners of a bracket or the like, they cooperate to secure a vessel to stage 5 when in a retracted configuration.

In one embodiment, limit 100 (e.g. pin) engages an inner wall or edge 110 of the vessel on an underside thereof. In one embodiment, limit 100 (e.g. pin) engages an inner corner 112 of the vessel on an underside thereof. In one embodiment, limit 100 (e.g. bracket) engages an outer wall or edge of the vessel. In one embodiment, limit 100 (e.g. pin) engages an outer corner of the vessel.

Referring to FIGS. 5 and 6, vessel support 1 may comprise a lug or pin 100 on each chamfered or beveled retention member 10 of an opposed set thereof. In one embodiment, pin 100 of a respective chamfered or beveled retention member 10 is set at or inward of lagging edge 30 relative to the center of point of stage 5.

In embodiments where limit 100 is resilient, it may limit/reduce a force applied against an edge/wall/corner of a vessel as a retention member engages or becomes biased against the edge/wall/corner. In one embodiment, pin 100 is not resilient.

Regardless of whether or not pin 100 is resilient or non-resilient, the one or more compliant members 70 of the plurality of arms 60 may also limit a force applied against an edge, wall, or corner of a vessel by pin 100 as a retention member becomes biased thereagainst.

Thus, limits or pins 100 of each retention member 10 of an opposed set of retention members may cooperate to secure vessel 40 to stage 5, such as when such opposed set of retention members are in the extended configuration. Moreover, each of actuator 50, actuator response element 55 or 57, plurality of arms 60, plurality of retention members (e.g. chamfered or beveled retention members) 10, and limits/pins 100 may cooperate to secure vessel 40 to stage 5.

In one embodiment, vessel support 1 may further comprise one or more load sensors 150. One or more load sensors 150 may be attached to base 3 or to stage 5. Load sensor(s) 150 may be very sensitive, and can decipher a difference in mass (compared to an expected value, such as of a volume of liquid dispensed into a culture vessel) of as low as 500 μg, 400 μg, 300 μg, 200 μg, 100 μg, 90 μg, 80 μg, 70 μg, 60 μg, 50 μg, 40 μg, 30 μg, 20 μg, or 10 μg. Where one or more load sensors 150 are particularly sensitive, damage may occur to the sensors if for example a mass is placed into a vessel while the vessel is resting on the stage (and on the sensors). Thus, it may be desirable to extend opposed set of arms 60 and corresponding (beveled or chamfered) retention members 10, thereby raising the vessel away (in an axis normal to stage 5 and/or stage plane $s_p$) from one or more sensors 150 prior to adding a mass into a vessel. Accordingly, a culture vessel disengages one or more load sensors 150 when an opposed set of (beveled or chamfered) retention members 10 are in the extended configuration.

In one embodiment, one or more load sensors 150 may measure the mass of a liquid or solid placed into the vessel, and if the mass is different from what is expected then a warning may be sent to an operator. Such feedback may be particularly pertinent when vessel support 1 is comprised in an automated system comprising a liquid handler and/or liquid dispenser, where the accurate dispensation or aspiration of liquids is important.

In one embodiment, vessel support 1 may further comprise one or more motor driven lead screws to move stage 5 along or in a plane parallel to the stage plane. In one embodiment, the stage is movable in the x axis, in the y axis, or both the x and y axes. In one embodiment, a first motor driven lead screw may move stage 5 in the x-axis and in the y-axis. In one embodiment, a first motor driven lead screw moves the stage in the x-axis, and a second motor driven lead screw moves the stage in the y-axis.

In one embodiment, vessel support 1 is automated, and thus one or more of tilt actuator 7, actuator 50, and read head 59, if present, are in communication with one or more processors and a source of electricity. In one embodiment, one or more of tilt actuator 7, actuator 50, read head 59, and one or more motor-driven lead screws are in communication with one or more processors and a source of electricity.

In one embodiment, vessel support 1 may be comprised in a system for culturing cells. In one embodiment, vessel support 1 may be comprised in an automated system for culturing cells.

Methods

In one aspect of this disclosure, vessel support 1 may be used in laboratory, analytical, or industrial applications. By way of non-limiting example, vessel support 1 may be used in methods of incubating, weighing, mixing, and aspirating.

Methods of this disclosure may relate to supporting a vessel on a vessel support (as described above), and securing the vessel thereto (as described above).

In one embodiment, securing a vessel to a vessel support comprises disposing the vessel between at least one opposed set of retention members. Types and features of retention members comprised in a vessel support may be as described hereinabove. Thus, in one embodiment, the securing a vessel to a vessel support comprises deforming (e.g stretching or pulling) one or more of an opposed set of retention members to a degree that will accommodate a vessel of interest, and releasing such deformed one or more of an opposed set of retention members, and restorative deformation forces bias a limit of each of the one or more of an opposed set of retention members against opposed inner or outer walls or edges or sides or corners of the vessel.

In one embodiment, securing a vessel to a vessel support comprises (from a retracted position) actuating pivoting member to extend or drive one or more of an opposed set of retention members into an extended position, thereby biasing a limit of each of the one or more of an opposed set of retention members into engagement with opposed walls or edges or sides or corners of the vessel, particularly on an underside thereof.

With a vessel secured as described above, the methods may further comprise moving stage (and vessel) relative to base of vessel support 1. In one embodiment, movement is a tilting operation to raise one edge of a vessel away from the base (in an axis normal to the base). In one embodiment, movement is in the stage plane, such as along the x-axis or the y-axis, or both.

FIG. 3 depicts an example of vessel support 1 in operation. In FIG. 3A, stage 5 includes retention members 10 in a retracted position and a vessel 40 having been placed thereupon (e.g. the vessel supporting surface). The vessel may already include contents therein (such as liquid medium), or may be ready to receive contents. As retention members 10 are in the retracted configuration, the vessel may not be well secured to stage 5, if for example it is intended to tilt stage 5 about pivot p and tilt axis t.

In embodiments of vessel support 1 comprising one or more load sensors 150, it may be important to extend retention members 10 prior to placing a vessel thereupon and/or providing contents into the vessel (if resting thereupon). FIG. 3B depicts vessel 40 secured to stage 5 by extending retention members 10 and bringing pins 100 into engagement with edge 110 or corner 112 of vessel 40. Accordingly, vessel is raised in an axis normal to stage 5, and in embodiments including one or more load sensors 150 the vessel may be taken out of contact therewith.

Thus, in embodiments of vessel support comprising one or more load sensors, methods of using such a vessel support may comprise measuring (and registering) a mass of a vessel prior to and/or after contents have been added thereto. In one embodiment, contents may be added to the vessel when it is disengaged from the one or more load sensors, and gently lowering the vessel (and contents therein) onto the one or more load sensors permits taking the measurement while not exposing the one or more load sensors to damage while adding the contents.

In some embodiments, it may be desirable to move vessel (such as has been secured as described above) relative to base 3 to distribute, mix, or otherwise any contents that may be contained therein. Distributing or mixing contents of a vessel may be accomplished by moving stage 5 (and vessel 40) relative to the stage plane in either along the x- and/or y-axes, such as by way of one or more motor-driven lead screws.

In some embodiments, distributing, mixing and aspirating contents of the vessel may be accomplished by tilting and/or oscillating stage 5 (and vessel 40) relative to base 3. In some embodiments, it may be important to move stage 5 (and vessel 40) relative to stage plane along both the x- and y-axes, and also to tilt stage 5 (and vessel 40) about tilt axis t.

Moving in the x-, y-, and z-axes may be performed in any sequence that is desired to carry out a particular assay or method being performed. A tilted stage (and vessel) is depicted in FIG. 3C, which tilting is effected via tilt actuator 7, about tilt axis t.

In one embodiment, the methods may further comprise measuring a degree of pivot (and/or any pivot at all) of an actuator response element, such as a pivoting member, and feeding the measurement back to a processor. Such a step may help ensure that a vessel is properly secured prior to initiating movement of the vessel (and stage) in one or more of the x-, y-, and z-axes. Measuring a degree of pivot may be carried out by the one or more magnet features and read head, as described above.

What is claimed is:

1. A vessel support, comprising:

i) a base;

ii) a stage having a vessel supporting surface, the stage connected to the base;

iii) at least one opposed set of retention members connected to the stage, the at least one opposed set of retention members biasable against one or more edges or walls of a vessel supported on the stage to thereby secure the vessel to the stage; and iv) a limit on each of the at least one opposed set of retention members that respectively engage one or more edges or walls of a vessel to secure the vessel to the stage, wherein one or more of the at least one opposed set of retention members are respectively extendable and retractable, and extending the at least one opposed set of retention members biases the limits thereon against the one or more edges or walls of the vessel.

2. The vessel support of claim 1, wherein the stage is tilted relative to the base, or tiltably connected to the base.

3. The vessel support of claim 2, further comprising a tilt actuator for tilting the stage about a tilt axis that is parallel and substantially in the same plane as an edge of the stage.

4. The vessel support of claim 1, wherein the vessel supporting surface of the stage is movable relative to the base along the x axis, the y axis, or both the x and y axes.

5. The vessel support of claim 1, wherein the one or more edges or walls are on an inner underside of the vessel, and the vessel is a skirted vessel.

6. The vessel support of claim 1, further comprising an actuator connected to one or more of the at least one opposed set of retention members, wherein actuation of the actuator extends or retracts one or more of the at least one opposed set of retention members.

7. The vessel support of claim 6, further comprising a pivoting member pivotally connected to the stage, wherein the at least one opposed set of retention members and the actuator are connected to the pivoting member and actuation of the pivoting member moves the at least one opposed set of retention members between a first extended position and second retracted position.

8. The vessel support of claim 7, further comprising a plurality of arms respectively attached to each retention member of an opposed set of retention members thereby connecting each retention member of an opposed set of retention members to the pivoting member, wherein the plurality of arms are pivotally connected to the pivoting member.

9. The vessel support of claim 8, further comprising one or more compliant member in each arm of an opposed set of the plurality of arms, wherein the one or more compliant member in an arm is intermediate a first end and a second end of the arm.

10. The vessel support of claim 1, wherein each retention member of the at least one opposed set of retention members comprises a chamfered or beveled portion.

11. The vessel support of claim 10, further comprising a leading edge connected along an incline to a lagging edge on each retention member of the at least one opposed set of retention members, the lagging edge set inward from the leading edge relative to a center point of the stage.

12. The vessel support of claim 1, wherein the limit is i) rigid or stiff; or ii) resilient or bendable.

13. The vessel support of claim 1, further comprising one or more load sensors, wherein the vessel disengages the one or more load sensors when the opposed set of retention members are extended.

14. The vessel support of claim 1, further comprising one or more load sensors, wherein the vessel disengages the one or more load sensors when the opposed set of retention members are extended.

15. The vessel support of claim 1, wherein i) the stage is tilted relative to the base, or tiltably connected to the base; and ii) the vessel supporting surface of the stage is movable relative to the base along the x axis, the y axis, or both the x and y axes.

16. A vessel support, comprising:

i) a base;

ii) a stage having a vessel supporting surface, the stage connected to the base;

iii) at least one opposed set of retention members connected to the stage, the at least one opposed set of retention members biasable against one or more edges or walls of a vessel supported on the stage to thereby secure the vessel to the stage, wherein each retention member of the at least one opposed set of retention members comprises a chamfered or beveled portion;

iv) a limit on each of the at least one opposed set of retention members that respectively engage one or more edges or walls of a vessel to secure the vessel to the stage, wherein one or more the at least one opposed set of retention members are respectively extendable and retractable, and extending the at least one opposed set of retention members biases the limits thereon against one or more edges or walls of the vessel; and v) a leading edge connected along an incline to a lagging edge on each retention member of the at least one opposed set of retention members, the lagging edge set inward from the leading edge relative to a center point of the stage, wherein the vessel ramps up the incline to raise the vessel in an axis to the vessel supporting surface as the at least one opposed set of retention members extend, and the vessel ramps down the incline to lower the vessel in the axis normal to the vessel supporting surface as the at least one opposed set of retention remembers retract.

17. The vessel support of claim 16, further comprising:

an actuator connected to one or more of the at least one opposed set of retention members, wherein actuation of the actuator extends or retracts one or more of the at least one opposed set of retention members;

a pivoting member pivotally connected to the stage, wherein the at least one opposed set of retention members and the actuator are connected to the pivoting member and actuation of the pivoting member moves the at least one opposed set of retention members between a first extended position and second retracted position; and a plurality of arms respectively attached to each retention member of an opposed set of retention members thereby connecting each retention member of an opposed set of retention members to the pivoting member, wherein the plurality of arms are pivotally connected to the pivoting member, wherein a first pair of the plurality of arms are attached to the pivoting member 180 degrees from one another and wherein a second pair of the plurality of arms are attached to the pivoting member 180 degrees from one another.

18. A vessel support, comprising:

i) a base;

ii) a stage having a vessel supporting surface, the stage connected to the base;

iii) at least one opposed set of retention members connected to the stage, the at least one opposed set of retention members biasable against one or more edges or walls of a vessel supported on the stage to thereby secure the vessel to the stage;

iv) a limit on each of the at least one opposed set of retention members that respectively engage one or more edges or walls of a vessel to secure the vessel to the stage, wherein one or more the at least one opposed set of retention members are respectively extendable and retractable, and extending the at least one opposed set of retention members biases the limits thereon against one or more edges or walls of the vessel;

v) an actuator connected to one or more of the at least one opposed set of retention members, wherein actuation of the actuator extends or retracts one or more of the at least one opposed set of retention members;

vi) a pivoting member pivotally connected to the stage, wherein the at least one opposed set of retention members and the actuator are connected to the pivoting member and actuation of the pivoting member moves the at least one opposed set of retention members between a first extended position and second retracted position; and vii) a plurality of arms respectively attached to each retention member of an opposed set of retention members thereby connecting each retention member of an opposed set of retention members to the pivoting member, wherein the plurality of arms are pivotally connected to the pivoting member, wherein a first pair of the plurality of arms are attached to the pivoting member 180 degrees from one another and wherein a second pair of the plurality of arms are attached to the pivoting member 180 degrees from one another.

19. The vessel support of claim 18, wherein attachment of each of the first pair of the plurality of arms to the pivoting member is not 90 degrees from each of the second pair of the plurality of arms.

* * * * *